United States Patent

[11] 3,614,611

| [72] | Inventor | Fred Benjamin<br>3251 Santa Maria Ave., Fullerton, Calif. 92632 |
|---|---|---|
| [21] | Appl. No. | 56,063 |
| [22] | Filed | June 25, 1970 |
| [45] | Patented | Oct. 19, 1971<br>Continuation of application Ser. No. 780,128, Nov. 29, 1968, now abandoned. |

[54] VOLTAGE AND WATTAGE INDICATOR FOR ARC LAMPS
2 Claims, 2 Drawing Figs.

[52] U.S. Cl. ........................................ 324/142, 324/114
[51] Int. Cl. ........................................ G01r 1/00, G01r 21/00
[50] Field of Search ........................................ 324/114, 140, 142, 141, 132

[56] References Cited
UNITED STATES PATENTS

| 600,981 | 3/1898 | Weston | 324/114 |
| 698,679 | 4/1902 | Duncan | 324/114 |
| 3,263,170 | 7/1966 | Schneider | 324/132 X |

FOREIGN PATENTS

| 861,582 | 2/1961 | Great Britain | 324/132 |
| 1,198,502 | | France | 324/142 |

Primary Examiner—Alfred E. Smith
Attorney—Pastoriza and Kelly

ABSTRACT: An inexpensive wattage indicator is provided in the form of a meter designed to indicate the sum of the voltage drops across a shunt in series with a source and load and a portion of a resistance means connected across the load. The resistance value of the shunt and resistance means and the meter scale are so adjusted that the indication of the sum corresponds substantially to the product of current and voltage supplied to the load thereby providing an indication of the wattage.

INVENTOR:
FRED BENJAMIN
BY
Elliott & Pastoriza,
ATTORNEYS.

VOLTAGE AND WATTAGE INDICATOR FOR ARC LAMPS

This is a continuation of U.S. application Ser. No. 780,128, filed Nov. 29, 1968 and now abandoned.

This invention relates generally to electrical measuring instruments and more particularly to a simplified meter circuit for indicating wattage supplied to a load.

BACKGROUND OF THE INVENTION

In certain types of electrically energized devices such as mercury arc lamps or xenon or xenon mercury arc lamps, it is important to be apprised of the wattage to the lamp. The life of certain types of these lamps is substantially diminished and the quality of the light impaired if the wattage to the lamp is more than typically 5 percent above or below its nominal rating. In the specific case of arc lamp devices, it is also desirable to be able to read the open circuit voltage before the lamp is started. This voltage typically should be from two to three and one-half times the operating voltage. Otherwise, it will not be possible to start the lamp.

Presently available wattmeters and voltmeters could be used for the foregoing purposes. However, a wattmeter must measure both current and voltage and multiply the two values in order to provide an indication of the wattage. In some types of wattmeters, this is done mechanically or electromechanically by producing a torque on the meter pointer proportional to voltage times current. Other types of wattmeters effect the multiplication electronically by means of tubes, transistors, coils, diodes, integrated circuits, and so forth. All such types of wattmeters are excessive in cost.

Because of the relatively high cost of such wattmeters, ammeters have often been used and sometimes both an ammeter and voltmeter. However, an ammeter is a poor approximation since lamp voltages have usually plus or minus 10 percent or more tolerances. A standard voltmeter and ammeter is cumbersome to the extent that a multiplication of the two readings is required.

BRIEF DESCRIPTION OF THE PRESENT INVENTION

The present invention provides a wattage indicator particularly useful for arc lamps which functions to provide a proper indication of actual wattage applied to the lamp without the disadvantages of the high cost of providing a conventional type wattmeter.

In a preferred embodiment, a simple shunt is connected in series between a source and a load such as an arc lamp, a resistance means is connected in parallel across the load, and a meter means including a scale means, is connected to the shunt and resistance means for providing an indication of the sum of the voltage drops across the shunt and at least a portion of the resistance means. The value of the resistance of the resistance means, the resistance of the shunt, and the meter scale means are so designed and adjusted that the indication of the sum corresponds substantially to the product of current and voltage supplied to the load. The indication thus provides a wattage reading. The basic principle or essence of the invention thus resides in the adding of quantities proportional to current and voltage rather than multiplying of the same, suitable adjustments being effected to minimize any error. Since it is much easier to add signals electrically rather than multiply the same, the advantages of a simplified and low cost wattage indicator result.

The addition is achieved in the preferred embodiment by a single meter connected across the shunt and a portion of the resistance means, this meter simply indicating the sum of the voltage drops across these elements. In other embodiments, separate volt and ammeters may be employed with scales designed to provide indications in opposite directions for changes in the current and voltage in the same direction. The physical spatial relationship of the respective indications thus constitutes a function of the sum of the readings which in turn again will provide an excellent approximation of the wattage applied to the load.

BRIEF DESCRIPTION OF THE DRAWINGS

A better understanding of the invention will be had by now referring to the accompanying drawings, in which.

DETAILED DESCRIPTION OF THE PREFERRED EMBODIMENT

Figure 1:
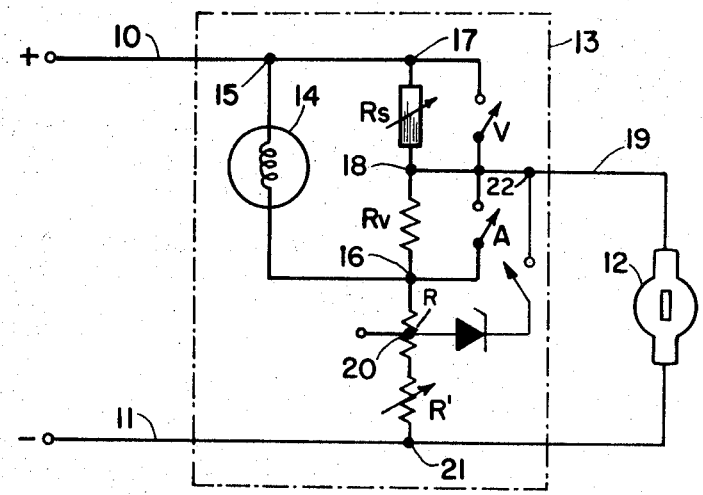
FIG. 1 is a schematic circuit diagram of a preferred embodiment of the invention.

Referring first to FIG. 1 there are shown power lines 10 and 11 connected from a source to a load 12 which may comprise a mercury arc lamp, merely by way of example. Within the dash-dot line 13 there is provided a wattage indicator in accord with a first embodiment of the invention.

As shown, this indicator includes a meter symbolically illustrated at 14, an adjustable shunt $R_s$ connected in series between the source line 10 and one input to the lamp 12, and a resistance means comprising a resistance portion $R_v$, a fixed resistance R and a variable resistance R' connected across the load 12.

The meter 14 in the embodiment shown is connected across the adjustable shunt $R_s$ and portion of the resistance means $R_v$ as indicated at the junctions 15 and 16. The shunt $R_s$ itself is essentially in series between the source and load, the terminal 17 for one end of the shunt connecting to the source line 10 and the terminal 18 for the other end of the shunt connecting to the input 19 for the lamp 12.

While not essential to the circuit, there is also illustrated in FIG. 1 a Zener diode Z connected across another portion of the resistance means defined between junction points 20 and 21. The diode is oriented so that its cathode line includes an optional switch, schematically shown in the open position connecting to the contact 20 and the anode connecting to a junction 22 on the input line 11. When the switch is open, as shown, the diode is not included in the circuit. When the switch is closed, however, the total voltage drop across the portion of the resistance means between 20 and 21 is limited to the Zener voltage for the diode.

Also provided as optional features are switches labeled V and A connected respectively between the junction point 17 and the input line 19 and the input line 19 and junction point 16. When the switch V is closed, the shunt $R_s$ is short circuited and when the switch A is closed, the resistance portion $R_v$ is short circuited.

Figure 2:
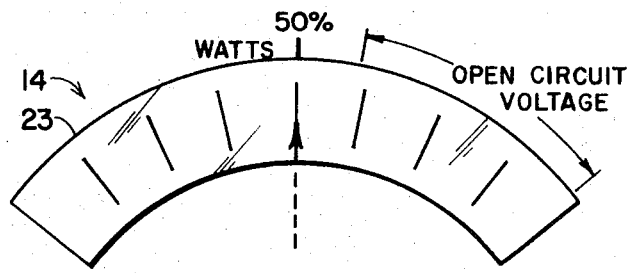
FIG. 2 is a diagrammatic showing of the scale associated with the meter in the embodiment of FIG. 1.

FIG. 2 illustrates at 23 a scale for the meter 14 of FIG. 1 so arranged as to provide an indication of wattage applied to the load 12. In the preferred embodiment of FIG. 1, the same meter scale 23 serves the purpose of indicating open circuit voltage.

OPERATION OF THE PREFERRED EMBODIMENT

In the operation of the invention as described in FIGS. 1 and 2, assume that the various switches V, A, and the switch connected in the cathode circuit of the Zener diode are all open as shown. Assuming the load 12 constitutes a mercury arc lamp, the starting voltage for this lamp will ordinarily be from two to three and one-half times the running voltage. Before the lamp is actually ignited, there will not be any current drawn through the lamp and thus the meter 14 will essentially be responsive to the voltage drop across the portion of the resistance $R_v$ between the junction points 18 and 21. The values of the resistances $R_v$, R, and R' are such that with the voltage dividing network defined, the meter reading will correspond to the open circuit voltage applied to the lamp 12. Since substantially no current is drawn before the lamp 12 is ignited, any voltage drop across the shunt $R_s$ is negligible.

FIG. 2 can thus provide an indication of the open circuit voltage over the upper percentage area of the scale. If this voltage does not exceed a given necessary input voltage to fire the lamp, the source voltage may be raised until such time as a proper indication is provided on the open circuit voltage portion of the scale 23.

When sufficient voltage is applied, the arc lamp 12 can be ignited and its operating voltage will be less than the starting voltage. When the lamp 12 is operating, it will be drawing current through the shunt $R_s$. If the resistance portion $R_v$ were absent or shorted out, the value of the remaining resistances and resistance of the shunt $R_s$ is such that the reading on the meter 14 would indicate amperes. Accordingly, with the resistance portion $R_v$ in the circuit, the actual reading on the meter 14 will correspond to the sum of the voltage drops across the shunt $R_s$ and the resistance portion $R_v$. This sum corresponds essentially to the sum of the volts plus the amps supplied to the load, and in accord with the invention, can be made to correspond to the product of volts times amperes supplied to the load. The meter 14 will thus indicate wattage.

In FIG. 2, the scale for the meter is arranged such that when proper wattage is being supplied to the arc lamp 12, the pointer for the scale will typically be midscale or at 50 percent. A deviation or movement of the pointer from this midposition will indicate a change in the wattage supplied to the load. As a specific example illustrative of the manner in which the addition of the voltage and amperage signals can be made to substantially equal the product of the voltage and amperage, assume that the nominal wattage rating for the load is 500 watts. Assume also that this wattage is supplied by a voltage of 60 volts and a current of 8.33 amperes. Under these conditions, the scale of FIG. 2 is designed such that a midreading of 50 percent will correspond to a nominal reading of 500 watts.

The condition that the wattage or product of volts times amps can best be expressed (for voltage variations of up to 10 percent) by a sum of a voltage signal plus an amperage signal, is: the voltage signal to be adjusted by means of $R'$ to 25 percent on the meter scale and the current signal to be adjusted by means of $R_s$ to 24.85 percent on the meter scale.

Assume for illustrative purposes that the voltage varies downward by 10 percent to a value of 54 volts. This corresponds to 22.5 percent on the meter scale. The current signal must then be 27.5 percent on the scale, in order for the meter to be at 50 percent on the scale for the nominal 500 watts. However, 27.5 percent corresponds to 9.22 amps if 8.33 amps equals 24.85 percent. The actual wattage when the meter reads at 50 percent and the voltage is 54 volts instead of 60 volts is 9.22 amps times 54 volts, which equals 498 watts (0.4 percent error). A similar calculation will show the actual wattage and error to be the same if the voltage is 66 volts instead of 60 volts. At 57, 60 and 63 volts the actual wattage is 501.5 watts (0.3 percent error).

Since standard meters usually have full scale accuracies of 2 percent, which amounts to 4 percent at half scale, the additional error introduced is in the order of one-tenth the inherent meter error and therefore negligible.

The variable resistance $R'$ and variable shunt $R_s$ in the circuit of FIG. 1 provide a means for adjusting to the typical 25 percent and 24.85 percent, respectively, to provide for different nominal wattages or other voltage and current combinations.

The same meter and scale of FIG. 2 may be employed to also indicate the open circuit voltage as previously described. With certain lamps, the open circuit voltage is four or more times higher than the operating voltage and would cause the pointer to move off the scale to the right, and the meter could possibly become damaged. In this case, it is desirable to incorporate the Zener diode Z in order to prevent "pegging" of the meter. Since it is only desirable to indicate that open circuit voltage above which the arc lamp can be fired, it is possible to provide this indication on the higher portion of the scale and quantitative readings of higher voltage values are unnecessary. The voltage for the Zener diode can thus be set at a suitable value such that the meter pointer will not be thrown off the scale to the right by simply limiting the maximum voltage that can be developed to a value slightly greater than the voltage necessary to initiate firing of the load. The scale of FIG. 2 can thus serve the dual function of a wattage meter and voltmeter even in cases of very high ratios of open circuit to operating voltage, or if the nominal operating point is chosen to be at more than 50 percent of the meter scale.

By means of the switches V and A described in FIG. 1, it is also possible to utilize the single meter as a voltmeter or ammeter separately. For example, when the switch V is closed to short circuit the shunt $R_s$, the meter 14 will indicate the operating voltage only of the load 12 as well as the open circuit voltage as described heretofore when the load is not running. When the switch A is closed to short circuit the resistance portion $R_v$, the meter 14 will indicate only the amps supplied to the load.

From the foregoing description, it will be evident that the present invention has provided a relatively inexpensive wattage indicator particularly suitable to loads such as arc lamps and the like. It should be understood that the circuit of the preferred embodiment described in FIGS. 1 and 2 can be very economically provided by simply starting with a standard voltmeter or ammeter and then adding to the circuit of the meter either internally or externally the additional shunt resistance or resistance portion as the case may be to enable the meter to read the sum of voltage signals developed across the shunt and resistance portions. The provision of the variable resistance $R'$ of FIG. 1, Zener diode Z, and short circuiting switches V and A can readily be added externally to the meter circuit itself.

What is claimed is:

1. A combination voltage and wattage indicator for arc lamps comprising:
    a. input terminals for connection to a source;
    b. output terminals for connection to an arc lamp having a starting voltage greater than twice the running voltage;
    c. a shunt connected in series between one of said input terminals and one of said output terminals;
    d. a resistance means connected in parallel across said output terminals and
    e. a single meter having a scale, said meter connecting across said shunt and a portion of said resistance means for providing an indication of the sum of the voltage drops across said shunt and said portion of said resistance means, the resistance of said resistance means and resistance of said shunt having values such that the indication of said sum on said scale corresponds substantially to the product of current and voltage supplied to said arc lamp when connected to said output terminals and running so that a wattage reading is provided, said scale having a portion to indicate the open circuit voltage supplied to said arc lamp when said arc lamp is connected to said terminals and not running and thus not drawing any appreciable current.

2. The subject matter of claim 1, including a Zener diode connected across another portion of said resistance means to limit the voltage to which said meter is responsive, to a value determined by the Zener voltage of said diode.